United States Patent

[11] 3,564,122

[72] Inventor Richard S. Wise
Boulder, Colo.
[21] Appl. No. 682,392
[22] Filed Nov. 13, 1967
[45] Patented Feb. 16, 1971
[73] Assignee Ball Brothers Research Corporation
Boulder, Colo.

[54] VIDEO SIGNAL SEPARATION MEANS
11 Claims, 1 Drawing Fig.

[52] U.S. Cl. .......... 178/5.4; 330/21, 330/84, 330/126
[51] Int. Cl. .......... H04n 9/12
[50] Field of Search .......... 178/5.4, 5.4—(C4), 4 (C5), 5.4 (MAT), 5.4 (SD); 330/28, 31, 84, 126; 307/233; 329/50

[56] References Cited

UNITED STATES PATENTS

| | | | |
|---|---|---|---|
| 2,631,201 | 3/1953 | Morrison | 330/84 |
| 2,778,883 | 1/1957 | Buckerfield | 179/171 |
| 2,793,246 | 5/1957 | Olive et al. | 178/5.4 |

*Primary Examiner*—Robert L. Richardson
*Attorney*—Campbell, Harris and O'Rourke

ABSTRACT: Apparatus for use in color television including a filter network for separation of color and monochrome signal components of a color television video signal, a resistive matrix for summing the monochrome and color components of the television signal and a path for feeding back the summation signal to the input of the circuit after recombining the separate components so as to minimize deterioration of signal quality due to imprecise frequency selection in the filter network.

PATENTED FEB 16 1971 3,564,122
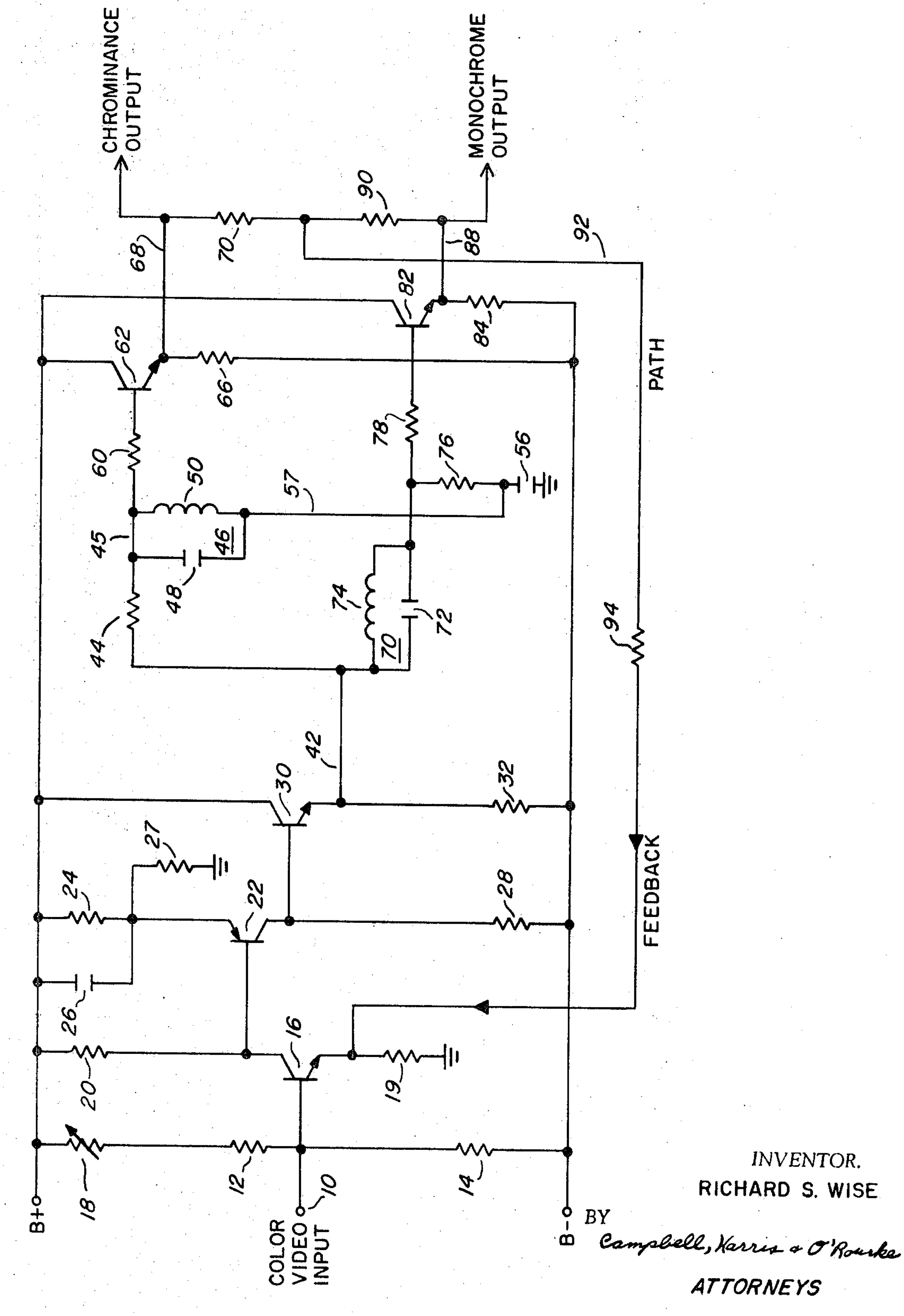
INVENTOR.
RICHARD S. WISE
BY
Campbell, Harris & O'Rourke
ATTORNEYS

VIDEO SIGNAL SEPARATION MEANS

BACKGROUND OF THE INVENTION

1. Field of the Invention

This invention relates to means for separation of the frequency components of a signal and in particular to separation of the monochrome and color signal components of a color television video signal.

2. Description of the Prior Art

It is oftentimes desirable to separate a signal into various frequency components. This is particularly true, for example, in processing of a color television signal from a camera or a receiver, where the luminance (or monochrome) and chrominance components of the video signal must be separated so that a proper proportion of current may be applied to separate color kinescopes or a tricolor kinescope to reproduce the picture.

Heretofore, signal separation apparatus was usually provided with one or more tank circuits and/or signal canceling means to achieve signal separation. However, none of these proved completely acceptable due, at least in part, to the cost brought about by close design tolerance requirements. Further, when tanks are utilized, they must be maintained in complementary relationship so that the narrow band of frequencies passed in one tank is rejected by the other. Since heating and aging effects on the tank components tend to change the tank characteristics, it proves difficult, if not impossible, to maintain the complementary relationship between the tank circuits even if the relationship could initially be established, which of itself is difficult because of the requirement of initial precise component selection. In prior art devices, this lack of precision caused distortion to be introduced when the chrominance and monochrome components were recombined after separate processing.

It is a feature of the present invention to obviate the necessity of perfectly matched complementary filters and the high cost concurrent with the use of the same. In achieving this feature, it has been found that deterioration of signal quality in the recombined signal, tending to occur when the filters are not truly complementary, is minimized and the effect of minor impedance changes of the tank circuit components in both the monochrome and chrominance channels are overcome to thus permit recombination to accurately reproduce the input video signal.

SUMMARY OF THE INVENTION

The circuit herein separates the chroma information contained in the color subcarrier from the monochrome component so that the component may be independently processed by conventional color processing and monochrome processing circuits, respectively, and a portion of which components may be recombined in a simple resistive matrix, and fed back to the video amplifier to be compared with the video input signal so as to minimize deterioration of signal quality of the separated components of the video input signal.

It is accordingly an object of this invention to provide a circuit effective to separate a color video signal into the chrominance and monochrome signal components with minimum signal deterioration.

A further object of this invention is to obviate the necessity of precise complementary filter networks in frequency selection means of a signal separation circuit.

Another object of this invention is to provide in a signal separation circuit means for recombining separated signal components of the color video signal, and means for feeding back the summation signal for comparison with the color video input signal.

A further object of this invention is to provide a color video signal separation circuit having a monochrome signal channel including a subcarrier frequency trap and a chrominance channel including a band-pass filter, and means for comparing a summation of the channel output signals with the color video input signal.

These and other objects may readily appear to those skilled in the art but are not intended to define the scope of the invention. Reference for such purpose should be had to the claims.

DESCRIPTION OF THE DRAWING

The single FIG. is a schematic circuit diagram of the signal separation circuit of the invention.

The signal separation circuit of the invention includes a color video input 10 intermediate ends of a pair of resistors 12 and 14 forming a voltage divider and leading to a first amplifier at the base of an NPN-type transistor 16. The opposite end of the resistor 14 leads to a B− source of supply voltage. The opposite end of the resistor 12 is connected to a potentiometer 18, the opposite end of which leads to a B+ source of supply voltage so that the potentiometer may be operated to vary the bias on the transistor 16. In particular, changing the resistance of potentiometer 18 changes the conductivity threshold of transistor 16 and the proportion of input signal voltage applied to the base thereof and the feedback signal voltage, the source of which feedback signal is more fully hereinafter described. The emitter of transistor 16 is connected to a resistor 19 leading to ground. The collector of the transistor 16 is connected through a resistor 20 to the B+ source of supply voltage and to a second amplifier at the base of PNP-type transistor 22, rendered conductive upon conduction of transistor 16. The emitter of the transistor 22 is connected to resistor 24 having an AC bypass capacitor 26 in parallel therewith. The opposite end of the parallel combination leads to the B+ source of supply voltage. The emitter of transistor 22 is further connected to a resistor 27 leading to ground. A collector of the transistor 22 is connected through a resistor 28 to the B− source of supply voltage and the collector also is coupled to the base of another NPN-type transistor 30. The collector of the transistor 30 leads directly to the B+ source of supply voltage and the emitter thereof is connected to a resistor 32 leading to the B− source of supply voltage.

The transistor 30 is connected in emitter-follower configuration so as to limit distortion caused by supply voltage variations and to match the high output impedance of amplifier 22 to the input impedance of the chrominance and monochrome channels of the signal separation circuit coupled by a conductor 42 from the emitter of transistor 30.

The chrominance channel includes a resistor 44 connected at one end to line 42 and at the other end to a conductor 45 at one end of a band-pass network 46, which includes a capacitor 48 and an inductor 50 connected in parallel therewith. The band-pass network 46 having a pass-band of approximately 2 megacycles is resonant at the color subcarrier frequency of approximately 3.58 megacycles per second and effectively presents an open circuit to the chrominance signal at such a frequency, so as to permit the chrominance signal component to be conducted through a resistor 60 connected at one end to the conductor 45 and at the other end to a base of an NPN transistor 62 provided for impedance matching. The other end of the band-pass network 46 is connected by a line 57 to one plate of a capacitor 56, the capacitor having another plate connected to ground.

The collector of the NPN transistor 62 is connected to a B+ source of supply voltage. The emitter of the transistor 62 is connected through a resistor 66 to the B− source of supply voltage. The emitter of the transistor 62 is further connected in emitter-follower configuration by a conductor 68 to one end of a resistor 70, forming one part of a resistive summing matrix.

The monochrome channel is also connected to conductor 42 and includes a trap tank circuit 70 having a capacitor 72 in parallel with an inductor 74, the opposite end of which tank circuit is connected to a resistor 76 leading to the conductor 57 at the one plate of capacitor 56. A resistor 78 is connected at one end intermediate the trap tank circuit 70 and resistor 76 and at the other end to the base of a transistor 82 also connected in emitter-follower configuration.

The collector of transistor 82 is connected to the source of B+ supply voltage and the emitter is connected to a resistor 84 leading to the source of B— supply voltage, the collector-emitter current path of transistor 82 being in parallel with the collector-emitter path of transistor 62. A conductor 88 leads from the emitter-follower transistor 82 to one end of a resistor 90 forming the second resistor of the resistive matrix.

Intermediate the series connection of resistors 70 and 90, a feedback conductor 92 leads therefrom which is provided to conduct a portion of the resistive matrix summation signal back through a resistor 94 to the emitter of transistor 16.

OPERATION

The color video input signal which includes a spectrum of frequencies containing the chrominance and monochrome information is received at the input 10 and the signal is amplified by transistors 16 and 22. The amount of bias applied to transistor 16 may be controlled by variation of the resistance of potentiometer 18.

The emitter-follower transistor 30 permits substantially the total voltage developed across load resistor 28 to be applied across resistor 32 with a corresponding increase in current through line 42 to the chrominance and monochrome channels.

The trap 46, adjusted to resonate at the chrominance subcarrier frequency, presents a high impedance to video signals in the subcarrier frequency range which signals contain the chrominance information. The band-rejection network 70 presents a high impedance to chrominance information which is contained in the 3.58 megacycles per second range and the chrominance component of the color video signal is prohibited from passing through the band-rejection tank network 70. The network 70 presents the high impedance to a narrow band of frequencies in the subcarrier frequency range so that the impedance to the video signal is sharply cut off to allow passing of the monochrome signal components.

The blocking capacitor 56 prohibits a direct current flow through resistors 44 and 76 to ground.

The emitter-follower transistors 62 and 82 in the chrominance and monochrome channels, respectively, permit high current flow in the summing matrix resistors 70 and 90 so that the voltage waveform of the color video input signal is reproduced, which signal provides the degenerative feedback voltage as applied through the feedback resistor 94 to the emitter of NPN-type transistor 16 for comparison with the color video input signal.

The voltage waveform of the chrominance and monochrome components may be processed before presentation to separate color kinescopes or tricolor kinescopes for monitoring by conventional means connected to the output of conductors 68 and 88, respectively.

Although only one embodiment of the invention has been shown and described, various modifications as may appear to those skilled in the art are intended to be within the contemplation of the invention as defined in scope by the claims.

I claim:

1. A signal separation circuit, comprising: input means adapted to receive an alternating current video signal having a spectrum of frequencies included therein; first video frequency selection means connected with said input means to receive said alternating current video signal therefrom and reject a predetermined portion of said spectrum of frequencies in said received alternating current video signal and passing at least a portion of the remainder of said spectrum of frequencies in said received alternating current video signal; second video frequency selection means connected with said input means to receive said alternating current video signal therefrom and pass substantially only said predetermined portion of said spectrum of frequencies in said received alternating current video signal; summing means connected to receive the alternating current video signal outputs from said first and second frequency selection means; and feedback means connected between said summing means and said input means to minimize deterioration of signal quality due to imprecise frequency selection by said frequency selection means.

2. The circuit defined by claim 1 wherein said summing means includes a pair of transistors connected in parallel emitter-follower configuration, the bases of the pair of transistors being connected to the first and second frequency selection means, respectively, and a resistive matrix connected between said emitters of said transistors for summing the signals from said transistors.

3. A system for separating a signal into separate frequency components, the system comprising:
- an input for receiving the signal;
- means connected to the input for amplifying the signal;
- a first filter connected to the amplifying means and tuned to reject substantially all of one of the frequency components of the amplified signal and to pass at least a portion of other components thereof;
- a second filter tuned substantially complementary to said first filter and connected to the amplifying means for passing substantially all of the one frequency component;
- a resistive matrix for summing the passed frequency components from the first and second frequency components;
- means connected to said first and second filters for impedance matching said filters and said resistive matrix; and
- feedback means connected to the resistive matrix and to the amplifying means whereby a portion of the summation signal from the summing means may be fed back and compared with the input signal to compensate for tuning imperfections in said filters.

4. The system as defined by claim 3 wherein the amplifying means includes: a first transistor amplifier having the base connected to receive the input signal and the emitter connected to the feedback means; means connected to said base for varying the bias on said first transistor to control the conductivity threshold thereof; a second transistor amplifier having the base connected to the output of said first transistor, and a third transistor amplifier having a control element connected to an output of said second transistor, said third transistor being connected in emitter-follower configuration to said first and second filters.

5. The system as defined in claim 3 wherein the impedance matching means includes: a pair of transistors connected in emitter-follower configuration, the emitter-collector paths of said transistors connected in parallel with each other and the bases being connected to receive the passed frequency components from said first and second filters, respectively, said resistive matrix being connected between the emitters of the pair of transistors.

6. A system for separating a color video signal into separate frequency components, the system comprising:
- an input for receiving the color video signal;
- means connected to the input for amplifying the color video signal;
- a first resistor connected to the amplifying means;
- a first parallel resonant circuit resonant at a frequency of one component and having first and second terminals, said first terminal being connected to the first resistor;
- a second parallel resonant circuit resonant substantially at the frequency of the one component and having first and second terminals, said first terminal being connected to the amplifying means;
- a second resistor connected at one end to the second terminal of the second resonant circuit and connected at another end to the second terminal of the first resonant circuit;
- means connected to the first terminal of the first resonant circuit and to the second terminal of the second resonant circuit for summing the separated frequency components; and
- means for feeding back the summation signal to the amplifying means for comparison with the color video input signal whereby the first parallel resonant circuit permits the one signal component to pass from the first resistor to the summing means and the second parallel resonant circuit prohibits passing of the one component to the summing means.

7. The system as defined by claim 6 wherein the amplifying means includes:
a first transistor of one conductivity type having a control element connected to the input for receiving the color video signal;
a second transistor of another conductivity type having a control element connected to an output of the first transistor; and
a third transistor of the one conductivity type having a control element connected to an output of the second transistor, said third transistor being connected in emitter-follower configuration to the first resistor and connected to the first terminal of the second parallel resonant circuit.

8. The system as defined in claim 7 wherein the summation means includes:
a third resistor connected to the first terminal of the first resonant circuit;
a fourth resistor connected to the second terminal of the second resonant circuit;
a fourth transistor of the one conductivity type having a control element connected to an opposite end of the third resistor and a collector-emitter path in parallel with the collector-emitter path of the third transistor;
a fifth transistor of the one conductivity type having a control element connected to an opposite end of the fourth resistor and a collector-emitter path in parallel with the collector-emitter path of said third and fourth transistors, said fourth and fifth transistors being connected in emitter-follower configuration;
a fifth resistor connected to the output of said fourth transistor; and
a sixth resistor connected at one end to the output of the fifth transistor and having an opposite end connected to said fifth resistor and to said feedback means.

9. The system as defined by claim 8 wherein the feedback means includes a seventh resistor connected intermediate the fifth and sixth resistors and an emitter of the first transistor, said seventh resistor being effective to control the proportion of the summation signal fed back to the amplifying means.

10. A system for separating a color video signal into chrominance and monochrome frequency components, the system comprising:
means for amplifying the color video signal;
a first resistor connected to the amplifying means;
a capacitor;
an inductor connected in parallel with the capacitor and defining a first resonant circuit tuned to the frequency of the chrominance component of the color video signal and having first and second terminals, said first terminal being connected to the first resistor;
another capacitor;
another inductor in parallel with the other capacitor and defining a second resonant circuit tuned to the frequency of the chrominance component of the color video signal and having first and second terminals, said first terminal being connected to the amplifying means;
a second resistor connected between the second terminal of the second resonant circuit and the second terminal of the first resonant circuit;
means connected to the first terminal of the first resonant circuit and to the second terminal of the second resonant circuit for summing the separated frequency components;
means for feeding back the summation signal to the amplifying means for comparison with the color input video signal; and whereby the first parallel resonant circuit permits the chrominance component to pass from the first resistor to the summing means and the second parallel resonant circuit prohibits passing of the chrominance component to the summing means and passes the monochrome component.

11. The system defined in claim 10 wherein the summing means includes:
a transistor having a base connected to receive the passed chrominance component;
another transistor having a base connected to receive the passed monochrome component;
the first mentioned transistor having a collector-emitter path in parallel with the collector-emitter path of the other transistor;
a resistive matrix connected between the emitters of the transistors for effecting a summation signal of the chrominance and monochrome signals from the emitters of the respective transistors; and
wherein the feedback means includes a resistor connected intermediate the resistive matrix and the amplifying means for controlling the proportion of the summation signal fed back to the amplifying means.